United States Patent
Ou et al.

(10) Patent No.: US 11,735,080 B1
(45) Date of Patent: Aug. 22, 2023

(54) DISPLAY SYSTEM AND PANEL DRIVING CIRCUIT

(71) Applicant: HIMAX TECHNOLOGIES LIMITED, Tainan (TW)

(72) Inventors: Yu Nian Ou, Tainan (TW); Chun Kai Chuang, Tainan (TW); Pei-Yuan Hung, Tainan (TW); Yu Hsiang Lin, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 18/048,434

(22) Filed: Oct. 20, 2022

(51) Int. Cl.
　G09G 3/00　　(2006.01)
　G06F 3/041　(2006.01)
　G09G 3/20　　(2006.01)

(52) U.S. Cl.
　CPC ........... *G09G 3/006* (2013.01); *G06F 3/0416* (2013.01); *G09G 3/2096* (2013.01); *G09G 2380/10* (2013.01)

(58) Field of Classification Search
　USPC ....................................................... 345/173
　See application file for complete search history.

(56) References Cited

U.S. PATENT DOCUMENTS

| | | | |
|---|---|---|---|
| 11,244,646 B1* | 2/2022 | Lin | G09G 3/3688 |
| 2002/0109787 A1* | 8/2002 | Moni | G06T 5/20 |
| | | | 382/254 |
| 2006/0016792 A1* | 1/2006 | Uecker | B23K 9/125 |
| | | | 219/137.71 |
| 2008/0218486 A1* | 9/2008 | Haseyama | G06F 3/0412 |
| | | | 345/173 |
| 2019/0075290 A1* | 3/2019 | Dubey | H04N 17/002 |
| 2019/0107908 A1* | 4/2019 | Zeng | G06F 3/0445 |
| 2019/0213071 A1* | 7/2019 | Anand | G06T 7/0002 |
| 2020/0202818 A1* | 6/2020 | Kuroiwa | G09G 5/393 |
| 2021/0026590 A1* | 1/2021 | Nam | G06F 3/16 |
| 2021/0272488 A1* | 9/2021 | Hwang | G09G 3/20 |
| 2022/0066586 A1* | 3/2022 | Chuang | G06F 3/0446 |

* cited by examiner

*Primary Examiner* — Chineyere D Wills-Burns
(74) *Attorney, Agent, or Firm* — CKC & Partners Co., LLC (57) ABSTRACT

The display system includes an automotive system, a display panel, and a panel driving circuit. The panel driving circuit receives a frame from the automotive system and determines if a panel error with respect to the display panel occurs. If the panel error occurs, the panel driving circuit replaces a portion of the frame with an error icon to generate a prompt frame, and transmit the prompt frame to the display panel. If the panel error does not occur, the panel driving circuit transmits the frame to the display panel.

15 Claims, 6 Drawing Sheets

DISPLAY SYSTEM AND PANEL DRIVING CIRCUIT

BACKGROUND

Field of Invention

The present disclosure relatives to a display system used in a vehicle. More particularly, the present disclosure relates to means of on-screen display (OSD).

Description of Related Art

One or more display panels are generally disposed in a vehicle, and an automotive system provides frames to be shown for the display panel. Any vehicle information such as speed and fuel can be shown on the display panel. However, there is no unified transmission protocol between the automotive system and the display panel. When the display panel has a malfunction, the automotive system cannot know what the error is. It makes the debugging time during the manufacturing process prolonged.

SUMMARY

Embodiments of the present disclosure provide a display system including an automotive system, a display panel, and a panel driving circuit electrically connected to the display panel and the automotive system. The panel driving circuit receives a frame from the automotive system and determines if a panel error with respect to the display panel occurs. If the panel error occurs, the panel driving circuit is configured to replace a portion of the frame with an error icon to generate a prompt frame, and transmit the prompt frame to the display panel. If the panel error does not occur, the panel driving circuit is configured to transmit the frame to the display panel.

In some embodiments, the error icon is pre-stored in the panel driving circuit and is not provided by the automotive system.

In some embodiments, the panel driving circuit includes: a transmission interface electrically connected to the automotive system to receive the frame; a memory electrically connected to the transmission interface for storing the frame; and an on-screen display circuit electrically connected to the memory. The error icon is stored in the on-screen display circuit. When the panel error occurs, the on-screen display circuit is configured to write the error icon into the memory to replace the portion of the frame.

In some embodiments, the frame is transmitted from the automotive system to the panel driving circuit by a low-voltage differential signaling (LVDS), and the transmission interface is a mobile industry processor interface (MIPI).

In some embodiments, the panel error includes a short error. The display panel includes multiple touch electrodes, and the panel driving circuit is electrically connected to the touch electrodes through multiple sensing lines. The panel driving circuit is configured to transmit a signal to the touch electrodes, and determine charge duration of each of the touch electrodes. If the charge duration is longer than first duration, the panel driving circuit is configured to determine that a short error occurs between the touch electrodes.

In some embodiments, if the charge duration is shorter than second duration, the panel driving circuit is configured to determine that an open error occurs on one of the sensing lines.

In some embodiments, the display system further includes a peripheral line having a first terminal electrically connected to a transmission terminal of the panel driving circuit and a second terminal electrically connected to a receiving terminal of the panel driving circuit. The panel driving circuit is configured to transmit a test signal from the transmission terminal to the peripheral line. If the test signal is not received at the receiving terminal, the panel driving circuit is configured to determine that a panel crack error occurs.

In some embodiments, the panel error includes an electrostatic discharge event, a panel crack error, abnormal panel power, abnormal temperature, restarting the system, an open error, a short error, memory write or memory read.

From another aspect, embodiments of the present disclosure provide a panel driving circuit electrically connected to a display panel. The panel driving circuit includes a microcontroller unit; a transmission interface electrically connected to an automotive system to receive a frame; a memory electrically connected to the transmission interface for storing the frame; and an on-screen display circuit electrically connected to the memory. The microcontroller unit is configured to determine if a panel error with respect to the display panel occurs. If the panel error occurs, the on-screen display circuit is configured to replace a portion of the frame with an error icon to generate a prompt frame, and the microcontroller unit is configured to transmit the prompt frame to the display panel. If the panel error does not occur, the microcontroller unit is configured to transmit the frame to the display panel.

In some embodiments, the panel error includes a short error. The display panel includes multiple touch electrodes, and the panel driving circuit is electrically connected to the touch electrodes through multiple sensing lines. The microcontroller unit is configured to transmit a signal to the touch electrodes, and determine charge duration of each of the touch electrodes. If the charge duration is longer than first duration, the microcontroller unit is configured to determine that a short error occurs between the touch electrodes.

In some embodiments, if the charge duration is shorter than second duration, the microcontroller unit is configured to determine that an open error occurs on one of the sensing lines.

In some embodiments, the panel driving circuit further includes: a transmission terminal electrically connected to a first terminal of a peripheral line; and a receiving terminal electrically connected to a second terminal of the peripheral line. The microcontroller unit is configured to transmit a test signal from the transmission terminal to the peripheral line. If the test signal is not received at the receiving terminal, the microcontroller unit is configured to determine that a panel crack error occurs.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

Figure 1:
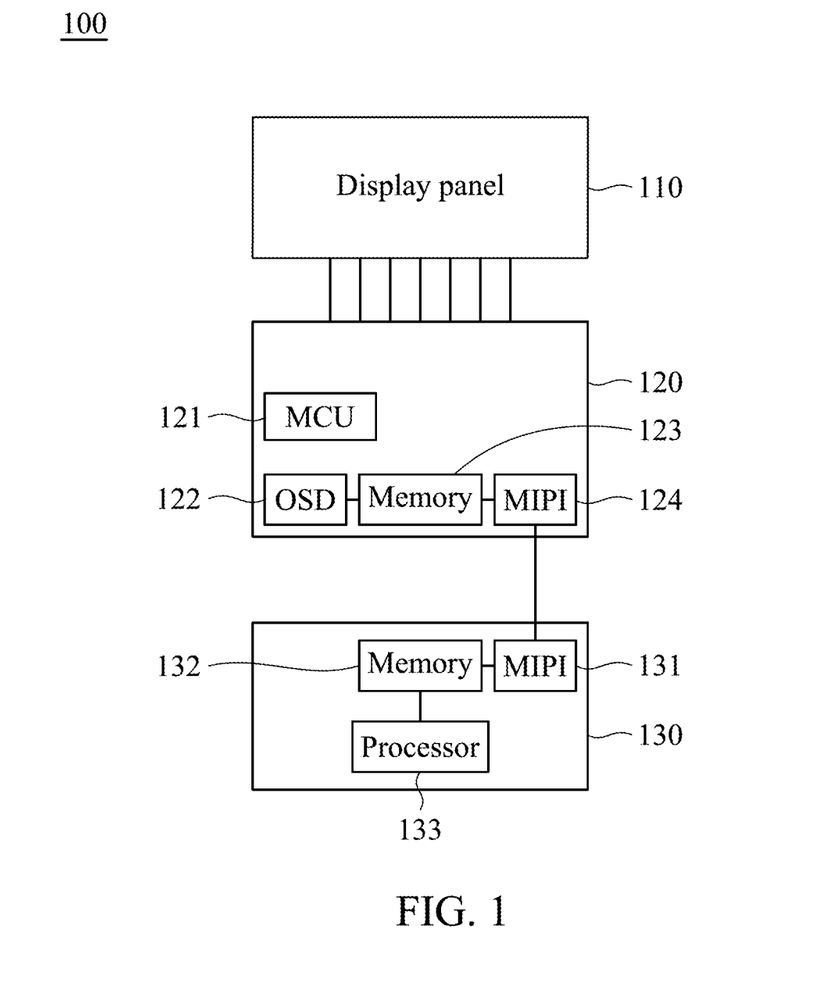
FIG. 1 is a schematic diagram of a display system in accordance with an embodiment.

FIG. 1 is a schematic diagram of a display system in accordance with an embodiment. Referring to FIG. 1, a display system 100 includes a display panel 110, a panel driving circuit 120, and an automotive system 130. The panel driving circuit 120 is electrically connected to the display panel 110 and the automotive system 130. The display panel 110 is, for example, a liquid crystal panel including multiple touch electrodes for providing a touch function. The panel driving circuit 120 can drive the display panel 110 to render frames and detect a touch position through the touch electrodes. Therefore, the panel driving circuit 120 is also referred to as a touch and display driver integration (TDDI) circuit. The display system 100 is disposed in a vehicle. For example, the display panel 110 can serve as a dashboard or a center console which is not limited in the disclosure.

The panel driving circuit 120 includes a microcontroller unit (MCU) 121, an on-screen display (OSD) circuit 122, a memory 123, and a transmission interface 124. The microcontroller unit 121 performs procedures and computation described below. The transmission interface 124 is, for example, Mobile Industry Processor Interface (MIPI) which is not limited in the disclosure. The memory 123 is electrically connected to the OSD circuit 122 and the transmission interface 124. The automotive system 130 includes a transmission interface 131, a processor 132, and a memory 133. The transmission interface 131 is, for example, MIPI for communicatively connected to the transmission interface 124. The automotive system 130 transmits frames to the panel driving circuit 120 through the transmission interface 131 by means such as Low-Voltage Differential Signaling (LVDS). The frames are received by the transmission interface 124 and stored in the memory 123. The panel driving circuit 120 drives the display panel 110 to render the frames.

In the embodiment, there is no transmission protocol (or message specification) established between the panel driving circuit 120 and the automotive system 130 in advance. It is difficult to exchange messages between the two other than frames. When the automotive system 130 detects an error about the vehicle such as engine problems or door not closed, it can add icons on the frame to be transmitted. However, when the panel driving circuit 120 detects an error, it cannot transmit the error message to the automotive system 130 through a transmission protocol. In the embodiments, the panel driving circuit 120 adds an error icon by means of on-screen display on the frames to be rendered. Therefore, the manufacturer of the automotive system 130 can be aware of the error happed to the display panel 110. In some scenarios, the user can also know that the display panel 110 is malfunctioning.

Figure 2:
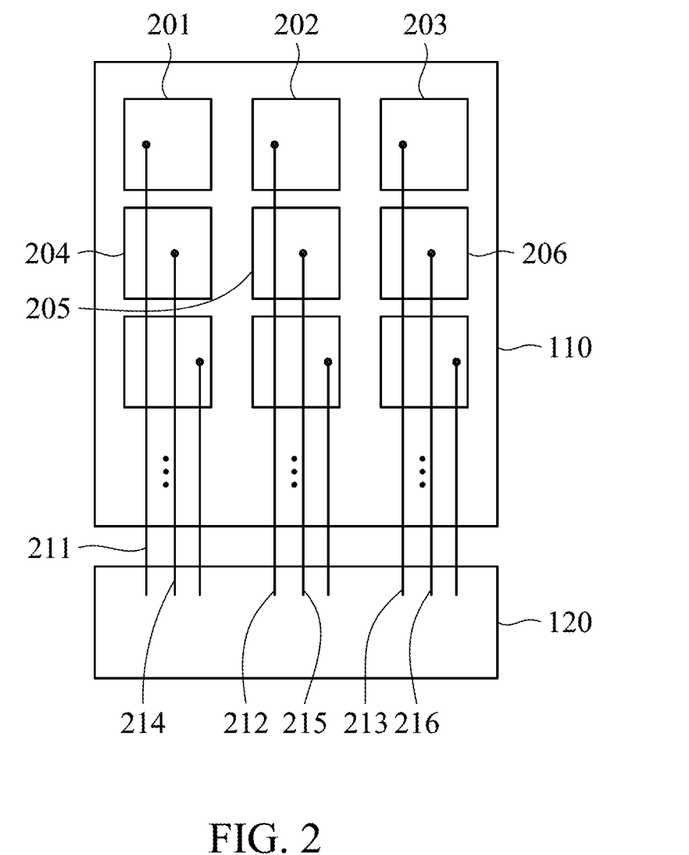
FIG. 2 is a schematic diagram of touch electrodes in the display panel in accordance with an embodiment.

FIG. 2 is a schematic diagram of touch electrodes in the display panel in accordance with an embodiment. Referring to FIG. 2, the display panel 110 includes multiple touch electrodes 201-206. The panel driving circuit 120 is electrically connected to the touch electrodes 201-206 through multiple sensing lines 211-216 respectively. In a display period, the panel driving circuit 120 applies a common voltage to the sensing lines 211-216 and the touch electrodes 201-206 serve as common electrodes. In a touch sensing period, the panel driving circuit 120 transmits signals to the touch electrodes 201-206 through the sensing lines 211-216 for charging the capacitors formed by the touch electrodes 201-206. The capacitance variation of the touch electrodes 201-206 is measured to determine a touch position. Not all wires are shown in FIG. 2 for simplicity. For example, the panel driving circuit 120 is also electrically connected to a thin film transistor in each pixel of the display panel 110 through multiple data lines for transmitting grey levels of the frame to be rendered.

Figure 3:
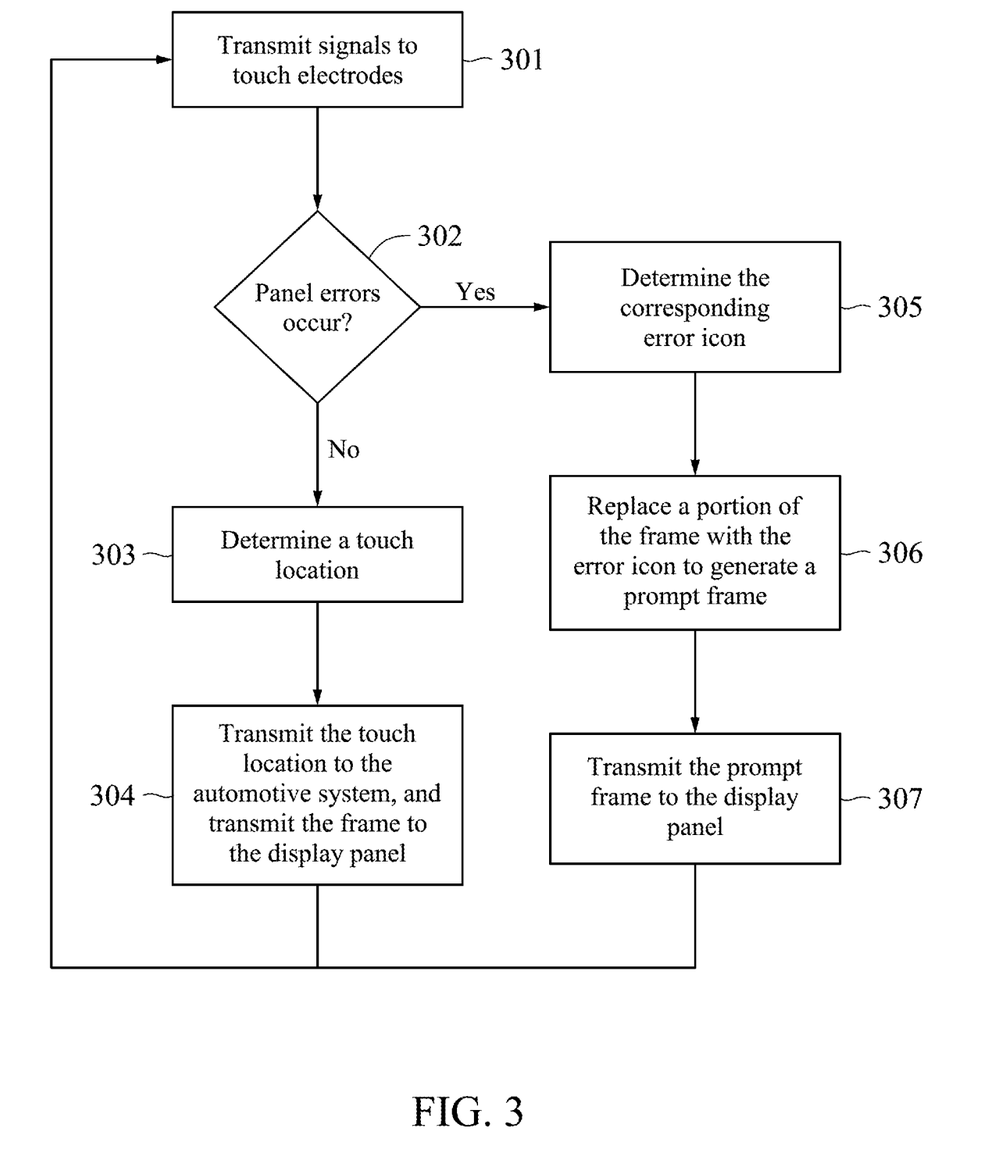
FIG. 3 is a flow chart of a display method performed by the panel driving circuit 120 in accordance with an embodiment.

FIG. 3 is a flow chart of a display method performed by the panel driving circuit 120 in accordance with an embodiment. Referring to FIG. 3, in step 301, signals are transmitted to the touch electrodes for detecting the touch position. In step 302, it is determined whether a panel error with respect to the display panel occurs. The panel error may be an electrostatic discharge event, a panel crack error, abnormal panel power, abnormal temperature, restarting the system, an open error, a short error, memory write or memory read which will be described below. If the result of the step 302 is "No", in step 303, the touch position is determined according to the capacitance variation of the touch electrodes 201-206. In step 304, the touch position is transmitted to the automotive system 130, and the frames from the automotive system 130 are transmitted to the display panel 110.

Figure 4:
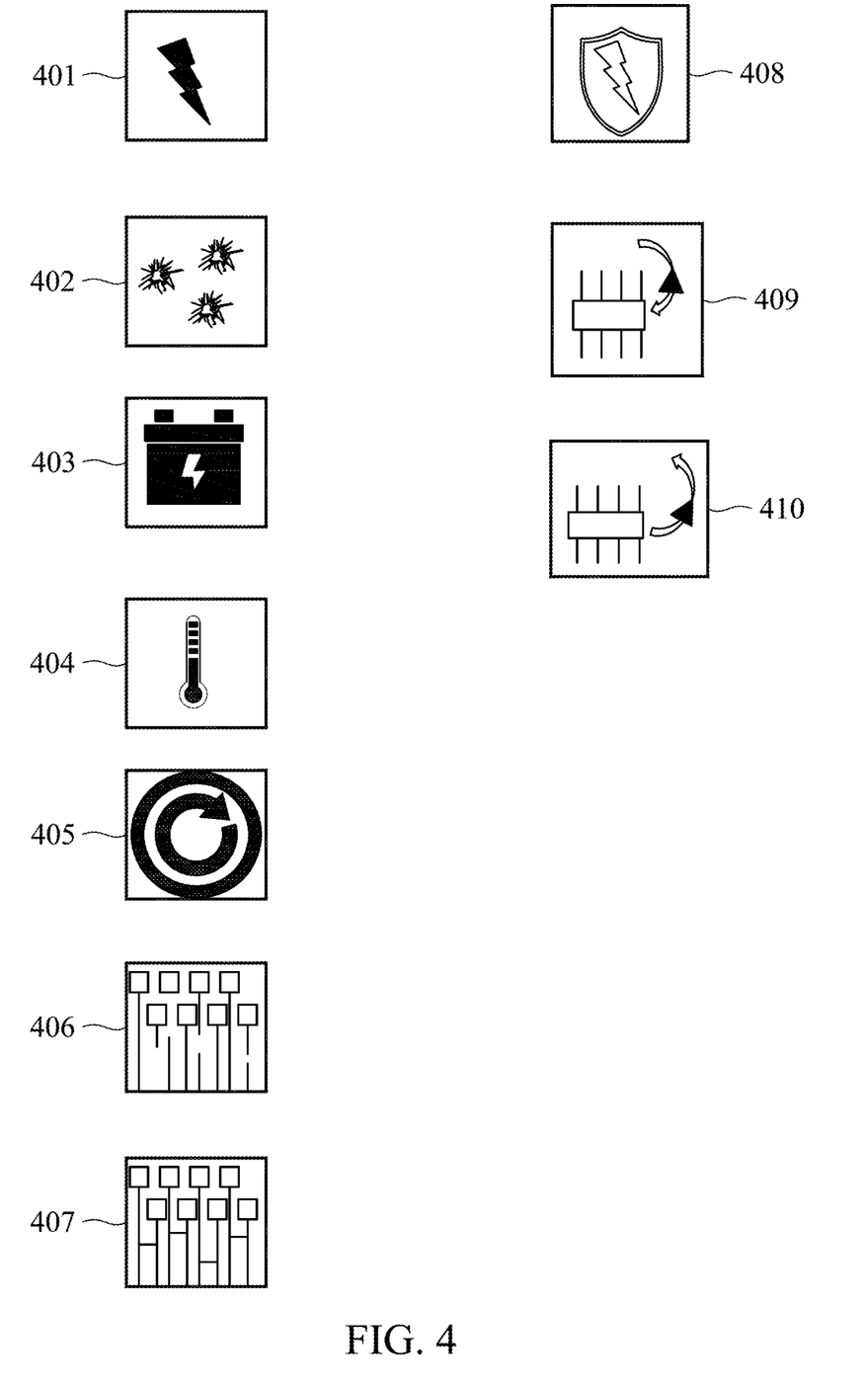
FIG. 4 is a diagram illustrating exemplary error icons in accordance with an embodiment.

If any panel error occurs (the result of the step 302 is "Yes"), then in step 305, an error icon corresponding to the panel error is determined. FIG. 4 is a diagram illustrating exemplary error icons in accordance with an embodiment. Referring to FIG. 4, an error icon 401 indicates an electrostatic discharge event; an error icon 402 indicates a panel crack error; an error icon 403 indicates abnormal panel power; an error icon 404 indicates abnormal temperature; an error icon 405 indicates that the system needs to be restarted; an error icon 406 indicates that an open error occurs on the sensing lines; an error icon 407 indicates a short error of the touch electrodes; an error icon 408 indicates noise protection; an error icon 409 indicates that the firmware is written into the memory; and an error icon 410 indicates that the firmware is reading out from the memory. The panel errors and the corresponding error icons are not limited to the examples above.

In step 306, a portion of the frame is replaced with the error icon to generate a prompt frame. The error icon may be inserted into any location of the frame. To be specific, referring to FIG. 1, the error icons are stored in the OSD circuit 122. When the panel error occurs, the OSD circuit 122 writes the corresponding error icon into the memory 123 to replace the portion of the frame to generate the prompt frame. In step 307, the prompt frame is transmitted to the display panel such that the user or the manufacturer of the automotive system 130 can see the error icon. Note that the error icons 401-410 are pre-stored in the panel driving circuit 120 and not provided by the automotive system 130.

That is to say, the panel driving circuit 120 actively renders the error icons by means of OSD.

Figure 5:
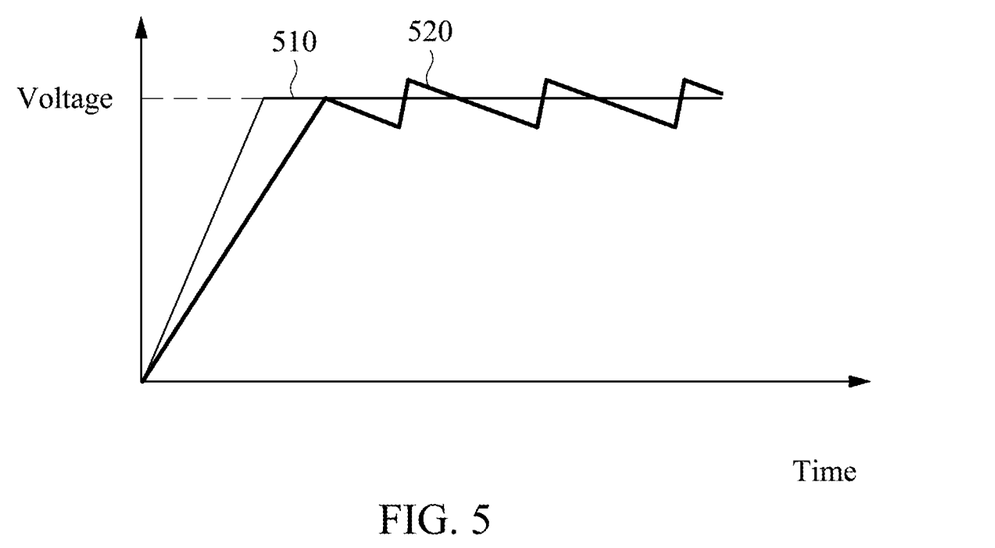
FIG. 5 is a diagram illustrating the charge duration when the short error occurs in accordance with an embodiment.

The detection of the short error, the open error, and the panel crack error are described herein. FIG. 5 is a diagram illustrating the charge duration when the short error occurs in accordance with an embodiment. Referring to FIG. 2 and FIG. 5, as mentioned above, the panel driving circuit 120 transmits signals to the touch electrodes 201-206 for charging the capacitors. If a short circuit occurs between the touch electrodes 201-206, the capacitance increases, and then it takes more time to raise the voltage to the predetermined level. A curve 510 represents the voltage in the normal situation, and a curve 520 represents the voltage when the short circuit occurs. Therefore, the panel driving circuit 120 can calculate charge duration (i.e. the time the voltage is raised to the predetermined level) of each of the touch electrodes 201-206. When charge duration is longer than first duration, it is determined that the short error occurs between the corresponding touch electrode and an adjacent touch electrode.

Figure 6:
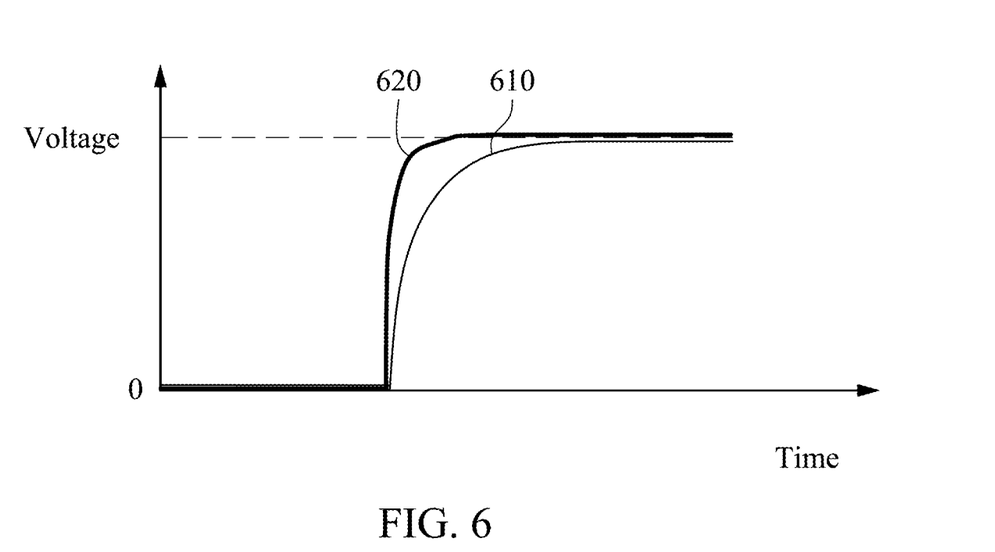
FIG. 6 is a diagram illustrating the charge duration when the open error occurs in accordance with an embodiment.

FIG. 6 is a diagram illustrating the charge duration when the open error occurs in accordance with an embodiment. Referring to FIG. 2 and FIG. 6, when one of the sensing lines 211-216 breaks and forms an open circuit, the capacitance thereof decreases, and thus the charge duration is shortened. A curve 610 represents the voltage in the normal situation; and a curve 620 represents the voltage when the open circuit occurs. Therefore, the panel driving circuit 120 calculates charge duration of each of the touch electrodes 201-206. When the charge duration is shorter than second duration, it is determined that the open error occurs on the corresponding sensing lines. The aforementioned first duration and the second duration can be determined by experiments.

Figure 7:
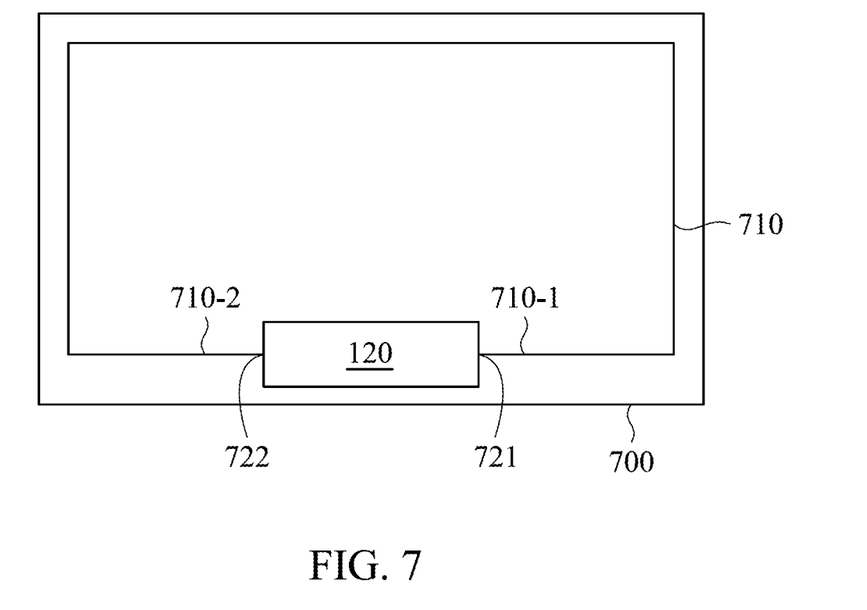
FIG. 7 is a schematic diagram of detecting the panel crack error in accordance with an embodiment.

FIG. 7 is a schematic diagram of detecting the panel crack error in accordance with an embodiment. Referring to FIG. 7, the display panel is shielded by a protection cover 700 such as glasses. A peripheral line 710 is disposed underneath the protection cover 700. The peripheral line 710 has a first terminal 710-1 electrically connected to a transmission terminal 721 of the panel driving circuit 120, and a second terminal 710-2 electrically connected to a receiving terminal 722 of the panel driving circuit 120. The panel driving circuit 120 transmits a test signal (may have a particular waveform) to the peripheral line 710 through the transmission terminal 721, and tries to receive the test signal at the receiving terminal 722. If the protection cover 700 breaks, an open circuit may be formed on the peripheral line 710, and thus the panel driving circuit 120 cannot receive the test signal. Therefore, if the test signal is not received, the panel driving circuit 120 determines that the panel crack error occurs.

Several embodiments are provided to describe the detection of the short error, the open error, and the panel crack error, but the disclosure is not limited thereto. Any sensor or detection circuit may be used in other embodiments to detect various errors.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display system comprising:
    an automotive system;
    a display panel; and
    a panel driving circuit, electrically connected to the display panel and the automotive system, and configured to receive a frame from the automotive system,
    wherein the panel driving circuit is configured to determine if a panel error with respect to the display panel occurs,
    if the panel error occurs, the panel driving circuit is configured to replace a portion of the frame with an error icon to generate a prompt frame, and transmit the prompt frame to the display panel, wherein the error icon is pre-stored in the panel driving circuit and is not provided by the automotive system,
    wherein if the panel error does not occur, the panel driving circuit is configured to transmit the frame to the display panel.

2. The display system of claim 1, wherein the panel driving circuit comprises:
    a transmission interface electrically connected to the automotive system to receive the frame;
    a memory electrically connected to the transmission interface for storing the frame; and
    an on-screen display circuit electrically connected to the memory, wherein the error icon is stored in the on-screen display circuit,
    wherein when the panel error occurs, the on-screen display circuit is configured to write the error icon into the memory to replace the portion of the frame.

3. The display system of claim 2, wherein the frame is transmitted from the automotive system to the panel driving circuit by a low-voltage differential signaling (LVDS), and the transmission interface is a mobile industry processor interface (MIPI).

4. The display system of claim 1, wherein the panel error comprises a short error, the display panel comprises a plurality of touch electrodes, and the panel driving circuit is electrically connected to the touch electrodes through a plurality of sensing lines,
    wherein the panel driving circuit is configured to transmit a signal to the touch electrodes, and determine charge duration of each of the touch electrodes,
    where if the charge duration is longer than first duration, the panel driving circuit is configured to determine that a short error occurs between the touch electrodes.

5. The display system of claim 4, wherein if the charge duration is shorter than second duration, the panel driving circuit is configured to determine that an open error occurs on one of the sensing lines.

6. The display system of claim 1, further comprising:
    a peripheral line having a first terminal electrically connected to a transmission terminal of the panel driving circuit and a second terminal electrically connected to a receiving terminal of the panel driving circuit,
    wherein the panel driving circuit is configured to transmit a test signal from the transmission terminal to the peripheral line,
    wherein if the test signal is not received at the receiving terminal, the panel driving circuit is configured to determine that a panel crack error occurs.

7. The display system of claim 1, wherein the panel error comprises a electrostatic discharge event, a panel crack error, abnormal panel power, abnormal temperature, restarting the system, an open error, a short error, memory write or memory read.

8. A panel driving circuit electrically connected to a display panel, the panel driving circuit comprising:
- a microcontroller unit;
- a transmission interface electrically connected to an automotive system to receive a frame;
- a memory electrically connected to the transmission interface for storing the frame; and
- an on-screen display circuit electrically connected to the memory,
- wherein the microcontroller unit is configured to determine if a panel error with respect to the display panel occurs,
- if the panel error occurs, the on-screen display circuit is configured to replace a portion of the frame with an error icon to generate a prompt frame, and the microcontroller unit is configured to transmit the prompt frame to the display panel,
- wherein if the panel error does not occur, the microcontroller unit is configured to transmit the frame to the display panel.

9. The panel driving circuit of claim 8, wherein the error icon is pre-stored in the panel driving circuit and is not provided by the automotive system.

10. The panel driving circuit of claim 8, wherein the frame is transmitted from the automotive system to the panel driving circuit by a low-voltage differential signaling (LVDS), and the transmission interface is a mobile industry processor interface (MIPI).

11. The panel driving circuit of claim 8, wherein the panel error comprises a short error, the display panel comprises a plurality of touch electrodes, and the panel driving circuit is electrically connected to the touch electrodes through a plurality of sensing lines,
- wherein the microcontroller unit is configured to transmit a signal to the touch electrodes, and determine charge duration of each of the touch electrodes,
- where if the charge duration is longer than first duration, the microcontroller unit is configured to determine that a short error occurs between the touch electrodes.

12. The panel driving circuit of claim 11, wherein if the charge duration is shorter than second duration, the microcontroller unit is configured to determine that an open error occurs on one of the sensing lines.

13. The panel driving circuit of claim 8, further comprising:
- a transmission terminal electrically connected to a first terminal of a peripheral line; and
- a receiving terminal electrically connected to a second terminal of the peripheral line,
- wherein the microcontroller unit is configured to transmit a test signal from the transmission terminal to the peripheral line,
- wherein if the test signal is not received at the receiving terminal, the microcontroller unit is configured to determine that a panel crack error occurs.

14. The panel driving circuit of claim 8, wherein the panel error comprises an electrostatic discharge event, a panel crack error, abnormal panel power, abnormal temperature, restarting the system, an open error, a short error, memory write or memory read.

15. A display system comprising:
- an automotive system;
- a display panel; and
- a panel driving circuit, electrically connected to the display panel and the automotive system, and configured to receive a frame from the automotive system, wherein the panel driving circuit comprises:
  - a transmission interface electrically connected to the automotive system to receive the frame;
  - a memory electrically connected to the transmission interface for storing the frame; and
  - an on-screen display circuit electrically connected to the memory,
- wherein an error icon is stored in the on-screen display circuit,
- wherein the panel driving circuit is configured to determine if a panel error with respect to the display panel occurs,
- if the panel error occurs, the on-screen display circuit is configured to write the error icon into the memory to replace a portion of the frame with the error icon to generate a prompt frame, and transmit the prompt frame to the display panel,
- wherein if the panel error does not occur, the panel driving circuit is configured to transmit the frame to the display panel.

* * * * *